April 4, 1950

A. W. MEYNIG 2,502,977

STUFFING BOX

Filed Sept. 8, 1947

A.W.Meynig
INVENTOR

BY C.A.Snow & Co.
ATTORNEYS

April 4, 1950        A. W. MEYNIG        2,502,977
STUFFING BOX
Filed Sept. 8, 1947        2 Sheets-Sheet 2
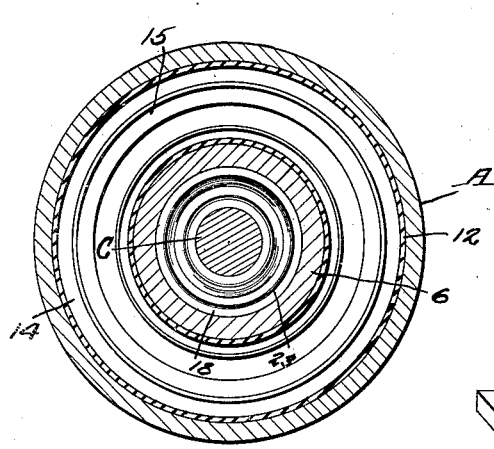
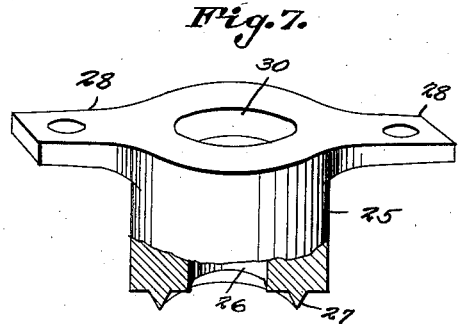
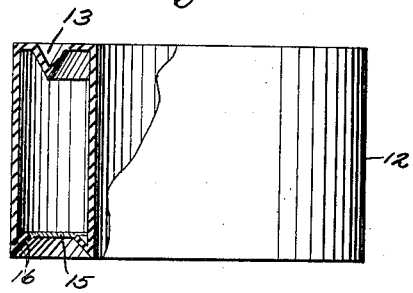
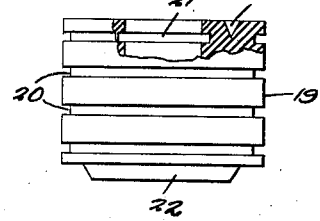
A.W. Meynig
INVENTOR
BY *Catnow & Co.*
ATTORNEYS Patented Apr. 4, 1950

2,502,977

UNITED STATES PATENT OFFICE 2,502,977

STUFFING BOX

August W. Meynig, Westbrook, Tex.

Application September 8, 1947, Serial No. 772,636

1 Claim. (Cl. 286—15)

This invention relates to new and useful improvements in stuffing boxes and more particularly and specifically to a novel and improved stuffing box of the type used in oil pumping units or the like.

The primary object of this invention resides in the provision of a stuffing box for use about the polished, piston rod of oil pumping units or the like which permits the improved action of the packing relative to the rod movement. On pumping units of the type set forth it is a known fact that the piston rods have erratic sidewise and forward and rearward movements which cause irregular and uneven wearing of the packing and the rod thus reducing the frictional contact of the packing with the rod resulting in leakage through the gland as well as the necessity of repair and replacement of the packing and the rod.

The improved construction of the stuffing gland comprising this invention provides for an improved gland packing structure which is more efficient and durable in use together with a packing box construction which permits a limited sliding and off-axial movement of the gland packing with the rod without sacrificing the sealing efficiency of the gland thereby maintaining the packing and the rod in their original conditions and increasing their life and efficiency.

Another object of this invention lies in the provision of a stuffing box structure which permits the easy packing and inspection of the box as well as the quick and easy installation thereof on a pumping unit or the like.

Still a further object of this invention resides in the provision of a stuffing box gland of the character set forth which is of a relatively simple, durable, and inexpensive design and construction.

Still further improvements and advantages of this invention will readily appear to those skilled in the art when the following description is read in the light of the accompanying drawings in which:

Fig. 3 is a horizontal section taken on line 3—3 of Fig. 1.

Fig. 4 is a partial vertical section of the self-pressure sealing gland.

Fig. 5 is a partial section of the oil reserve cup.

Fig. 6 is a perspective view of the oil cup washer.

Fig. 7 is the packing jam in partial section.

Fig. 8 is a partial vertical section of the packing unit for the box gland.

Figure 1:
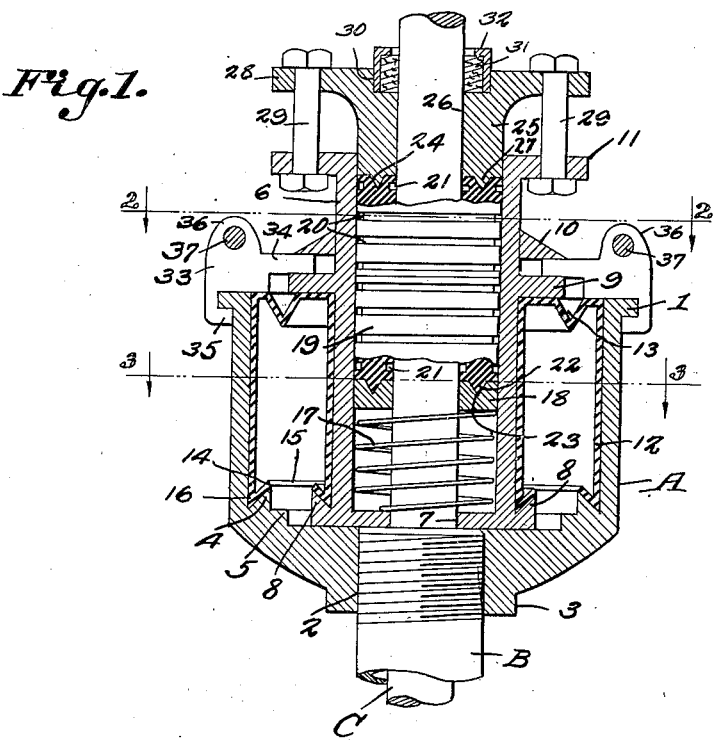
Fig. 1 is a vertical section of the stuffing box.
Figure 2:
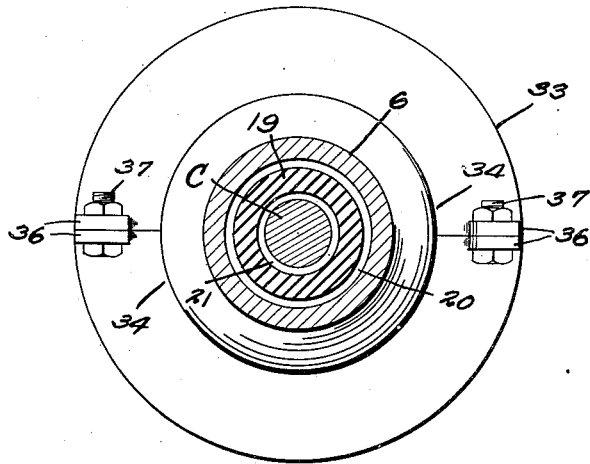
Fig. 2 is a horizontal section taken on line 2—2 of Fig. 1.

Referring now to the accompanying drawings which illustrate only the preferred embodiment of this invention and in which like characters indicate similar parts throughout, A designates the stuffing box housing which is composed of a cup-like, circular body provided with an extruded circumferential flange 1 about its upper circumference and a central, threaded aperture 2 in its bottom provided with an external wrench space flange 3.

The outer circumference of the inner bottom of the housing is formed upwardly and inwardly in a substantially V-shaped, raised seat 4 which is perpendicular stepped once, as at 5, to the bottom of the housing.

An elongated circular packing-retaining member 6 is inserted centrally into the housing A to seat on the bottom thereof and to project outwardly thereabove.

The retaining member 6 has a partially enclosed bottom, opening into the housing aperture 2 through a central circular aperture 7 therein, and additionally the outer circumference of the base of the retaining member is provided with a formed, upwardly disposed, V-shaped flanged seat 8 designed to correspond with the housing seat 4 and be concentrically located therewithin when the retaining member is positioned as described.

The retaining member 6 is also provided with a pair of closely spaced ring flanges, 9 and 10, intermediate its length so positioned thereabout as to dispose the underside of the lower of the two flanges 9 flush with the top edge of the housing when the retainer member is seated in the housing as described. The upper extended end of the retainer member 6 is formed into an enlarged circumferential flange 11 which is disposed well above the open top of the housing A.

A self-pressure sealing gland is provided about the retaining member within the housing A to permit the improved action of the stuffing box. This sealing gland comprises a tubular rubber spaced wall member 12 which is provided with a similarly formed V-shaped depression 13 in its top and a like depression 14 in its bottom with the lower depression 14 opening into the interior of the member through a circular slot 15 formed at the base of the lower V-shaped depression. This gland member is of substantially the same length as the depth of the housing member A and it seats circumferentially about the retainer member 6, within the housing with the lower pointed edges 16, formed by the lower V-shaped depression 14, seating on and in conformity with the inner and outer V-shaped seats 4 and 8 previously mentioned.

The housing member A is then secured by virtue of its lower threaded opening 2, upon the upper end of an oil pumping unit B or the like with the piston rod C of the unit disposed upwardly through the aperture 2 of the housing and centrally through the retaining member 6 to project thereabove.

A coiled spring 17, circumferentiating the piston rod C, is seated upon the bottom of the retaining member 6 and a lower seat 18 for the packing of the box is seated circumferentially about the piston rod C upon the upper end of the coiled spring 17.

The packing for this type stuffing gland disclosed herein is another important embodiment of this invention and it comprises a solid circular rubber ring 19 provided with externally formed vertically spaced depressions 20 therein and corresponding internally formed depressions 21. The lower end or bottom of this packing member is provided with a male formed V-shaped extension 22 which seats in a female formed V-shaped depression 23 in the top of the lower packing seat 18 to securely hold it in place, and the upper end of this packing member is provided with a similarly formed V-shaped depression 24.

The cylindrical packing gland 25 provided with a central piston rod receiving passageway 26 is seated over the piston rod C to project downwardly and tightly within the retaining member 6 to seat upon the upper end of the packing member 19 with provided V-shaped projections 27 in the base thereof seating in the V-shaped depressions 24 of the upper end of the packing member. This gland member 25 is provided with projecting ears 28 at its upper end which overlies the flange 11 of the retaining member and is securely interconnected therewith by a plurality of nut and bolt arrangements 29 circumferentially spaced thereabout. A circular depression 30 is formed concentrically about the piston rod receiving passageway 26 in the top of the gland member 25 adaptable to receive a flat circular felt washer 31 and an open bottomed oil reserver cup 32 which is frictionally fitted downwardly over the felt washer into the depression retaining the washer in place.

A pair of semi-circular split ring members 33 provided with horizontal flanges 34 extending inwardly therefrom at the upper ends thereof and short inwardly extending flanges 35 extending inwardly from the bottom thereof are positioned about the housing A with the upper flanges 34 extending for a spaced distance inward between the retainer member flanges 9 and 10 and with the lower flanges 35 underlying the upper housing flange 1. This pair of semi-circular members are each provided with a pair of diametrically opposed raised ears 36 which permit the two members to be interlocked by studs 37 when they are placed in the position described thereby locking the retaining member and the gland in place within the housing similarly as the gland member 25 locks the packing member within the retainer member by virtue of its interconnection therewith.

Thus it may be seen that by virtue of the interconnection of the gland member with the retainer member, which is securely locked within the housing, the packing member is adjustable within the retainer member as to its vertical position and with the occurrence of leakage by the packing member the gland may be forced downwardly thereupon causing the two to slide slightly for a closer frictional engagement with the rod and the retaining member thus reducing leakage thereby.

In the operation of this stuffing box with the upward and downward movement of the piston rod the gland 12 will permit any off center movement of the rod from side to side or backwardly and forwardly to be absorbed by its self-pressure breathing action through the aperture 15. In other words any off center movement of the piston rod within the packing member, which would ordinarily cause off center wear, will in this construction permit an off center movement of the retaining member together with the packing member in any direction against the gland member 12 thereby retaining the packing member in alignment with the rod and without sacrificing any of the sealing qualities of the packing member which would ordinarily occur with off center compression thereof caused by the off center movement of the piston rod.

An additional feature of this invention, as stated heretofore, resides in the provision of the depressions 20 and 21 in the stuffing member which will tend to continually retain a tight frictional engagement between the packing retaining member 6 and the piston rod C at all times thereby providing a high sealing efficiency of the gland. It may also be seen that by seating the packing member on a spring in the manner described the entire packing member will be allowed to slide vertically with vertical movement of the rod increasing the ability of the packing member to follow the off-axial movements of the rod and still maintain good sealing qualities.

Having thus described and explained the construction and improved function of this invention and with full belief that I have contemplated any and all modifications of the invention which fall within the scope of the appended claims what I desire to claim in Letters Patent is.

I claim:

An oil well piston rod stuffing box, comprising a housing, a packing retaining member mounted for lateral sliding movement within the housing, a piston rod operating through the packing retaining member, a V-shaped annular flange providing a seat extending inwardly from the housing, a V-shaped annular flange providing a seat, concentrically located within the V-shaped annular flange of the housing, extending from the lower end of the packing retaining member, a hollow sealing gland having its upper end closed and having an annular V-shaped depression formed in ihe upper closed end thereof, the lower end of the outer wall of the hollow sealing gland being fitted within the V-shaped seat of the housing, the lower end of the inner wall being fitted in the V-shaped annular flange of the packing retainer, securing the hollow sealing gland in position against the walls of the housing and packing retaining member, providing a liquid seal.

AUGUST W. MEYNIG.

REFERENCES CITED

The following references are of record in the file of this patent:

UNITED STATES PATENTS

| Number | Name | Date |
|---|---|---|
| 669,318 | Caumont | Mar. 5, 1901 |
| 963,645 | Pendleton | July 5, 1910 |
| 1,272,312 | Podobiedoff | July 9, 1918 |
| 1,772,210 | Dale | Aug. 5, 1930 |
| 1,921,555 | Welsh | Aug. 8, 1933 |
| 1,983,938 | Humason et al. | Dec. 11, 1934 |
| 2,036,537 | Otis | Apr. 7, 1936 |
| 2,182,246 | Boyer et al. | Dec. 5, 1939 |
| 2,219,064 | Boyer et al. | Oct. 22, 1940 |

FOREIGN PATENTS

| Number | Country | Date |
|---|---|---|
| 691 | Great Britain | of 1862 |